United States Patent
Choi et al.

(10) Patent No.: US 8,969,107 B2
(45) Date of Patent: Mar. 3, 2015

(54) METHOD OF MANUFACTURING A NANO-ROD AND METHOD OF MANUFACTURING A DISPLAY SUBSTRATE

(75) Inventors: Tae-Young Choi, Seoul (KR); Bo-Sung Kim, Seoul (KR); Kwang-Yeol Lee, Namyangju-si (KR); See-Won Kim, Gwangju-si (KR)

(73) Assignee: Samsung Display Co., Ltd., Yongin (KR)

( * ) Notice: Subject to any disclaimer, the term of this patent is extended or adjusted under 35 U.S.C. 154(b) by 56 days.

(21) Appl. No.: 13/424,155

(22) Filed: Mar. 19, 2012

(65) Prior Publication Data

US 2013/0052763 A1 Feb. 28, 2013

(30) Foreign Application Priority Data

Aug. 31, 2011 (KR) ........................ 10-2011-0087512

(51) Int. Cl.
| | | |
|---|---|---|
| H01L 21/00 | (2006.01) | |
| C01B 13/32 | (2006.01) | |
| B82Y 30/00 | (2011.01) | |
| B82Y 40/00 | (2011.01) | |
| C01G 9/02 | (2006.01) | |
| C01G 1/02 | (2006.01) | |

(52) U.S. Cl.
CPC ................ C01B 13/32 (2013.01); B82Y 30/00 (2013.01); B82Y 40/00 (2013.01); C01G 9/02 (2013.01); C01G 1/02 (2013.01); *C01P 2004/04* (2013.01); *C01P 2004/16* (2013.01); *C01P 2004/61* (2013.01); *C01P 2004/62* (2013.01); *C01P 2004/64* (2013.01)
USPC ............... 438/23; 438/403; 438/82; 438/151; 438/72; 438/63; 257/632; 257/506; 257/347

(58) Field of Classification Search
USPC .......... 438/23, 403, 82, 151, 72, 63; 257/632, 257/506, 347
See application file for complete search history.

(56) References Cited

U.S. PATENT DOCUMENTS

| | | | | |
|---|---|---|---|---|
| 7,588,828 | B2 * | 9/2009 | Mushtaq et al. | 428/403 |
| 8,216,961 | B2 * | 7/2012 | Lee | 502/240 |
| 2005/0255629 | A1 * | 11/2005 | Han et al. | 438/104 |
| 2006/0202167 | A1 * | 9/2006 | Landry et al. | 252/301.4 R |
| 2008/0095852 | A1 * | 4/2008 | Kong et al. | 424/489 |
| 2008/0241262 | A1 * | 10/2008 | Lee et al. | 424/490 |
| 2010/0056366 | A1 * | 3/2010 | Lee | 502/300 |

FOREIGN PATENT DOCUMENTS

| | | | | |
|---|---|---|---|---|
| CN | 101186524 | A | * | 5/2008 |
| JP | 4051433 | | | 12/2007 |
| KR | 0550355 | | | 2/2006 |
| KR | 1020100106667 | A | * | 4/2010 |
| KR | 1020100106667 | | | 10/2010 |
| KR | 1012217 | | | 1/2011 |
| KR | 1012217 | B1 | * | 2/2011 |

* cited by examiner

*Primary Examiner* — Fernando L Toledo
*Assistant Examiner* — Mohammed Shamsuzzaman
(74) *Attorney, Agent, or Firm* — H.C. Park & Associates, PLC

(57) ABSTRACT

A method of manufacturing a nano-rod and a method of manufacturing a display substrate in which a seed including a metal oxide is formed. A nano-rod is formed by reacting the seed with a metal precursor in an organic solvent. Therefore, the nano-rod may be easily formed, and a manufacturing reliability of the nano-rod and a display substrate using the nano-rod may be improved.

9 Claims, 8 Drawing Sheets

METHOD OF MANUFACTURING A NANO-ROD AND METHOD OF MANUFACTURING A DISPLAY SUBSTRATE

CROSS REFERENCE TO RELATED APPLICATION

This application claims priority from and the benefit of Korean Patent Application No. 2011-0087512, filed on Aug. 31, 2011, which is hereby incorporated by reference for all purposes as if fully set forth herein.

BACKGROUND

1. Field

Exemplary embodiments of the present invention relate to a method of manufacturing a nano-rod and a method of manufacturing a display substrate. More particularly, exemplary embodiments of the present invention relate to a method of manufacturing a nano-rod used for a semiconductive material and a method of manufacturing a display substrate.

2. Discussion of the Background

Generally, amorphous silicon, poly silicon, an oxide semiconductor, etc., may be used as a semiconductive material in forming a thin-film transistor ("TFT"). The oxide semiconductor is formed at a low temperature, is easily formed on a large-sized substrate, and has large electron mobility. Thus, the oxide semiconductor has recently received attention as a semiconductor replacing the amorphous silicon or the poly-silicon in several fields.

A technique related to forming a semiconductor including a nano-rod having a nano size has recently been developed. A vapor-liquid-solid process ("VLS"), a sonochemical method, a hydrothermal method, etc., are known as methods for forming the nano-rod.

A VLS process using a gold catalyst has disadvantages in that it is performed at a high temperature and is expensive. Although the cost of a VLS process using a metal foil, for example, a zinc foil, is smaller than that of the VLS process using a gold catalyst, the VLS process using the metal foil has a disadvantage in that it is performed at a high temperature. In addition, it is difficult to control a thickness and a length of a nano-rod formed by the VLS process using the metal foil so that application of the VLS process using the metal foil is difficult. When the nano-rod is formed via the sonochemical method, an electron moves slowly as compared to when the electron moves along an axis of the nano-rod so that electron mobility is small since the nano-rod grows vertically with respect to a substrate. Although the nano-rod is synthesized under a condition of an aqueous solution, it is difficult to control the size, shape, etc. of the nano-rod so that mass production of the nano-rod is difficult.

SUMMARY OF THE INVENTION

Exemplary embodiments of the present invention provide a method of manufacturing a nano-rod capable of controlling a size of the nano-rod and improving electron mobility.

Exemplary embodiments of the present invention also provide a method of manufacturing a display substrate using the nano-rod.

Additional features of the invention will be set forth in the description which follows, and in part will be apparent from the description, or may be learned by practice of the invention.

An exemplary embodiment of the present invention discloses a method of forming a nano-rod, including forming a seed including a metal oxide, and forming a nano-rod by reacting the seed with a metal precursor in an organic solvent.

Another exemplary embodiment of the present invention also discloses a method manufacturing a display substrate. In the method, a seed including a metal oxide is formed, and then the seed and a metal precursor are reacted in an organic solvent to form a nano-rod. A semiconductor pattern including the nano-rod and overlapping with a first electrode is formed on a substrate on which the first electrode is formed. A second electrode overlapping with the semiconductor pattern is formed. A pixel electrode connected to a thin-film transistor including the semiconductor pattern, the first and second electrodes is formed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
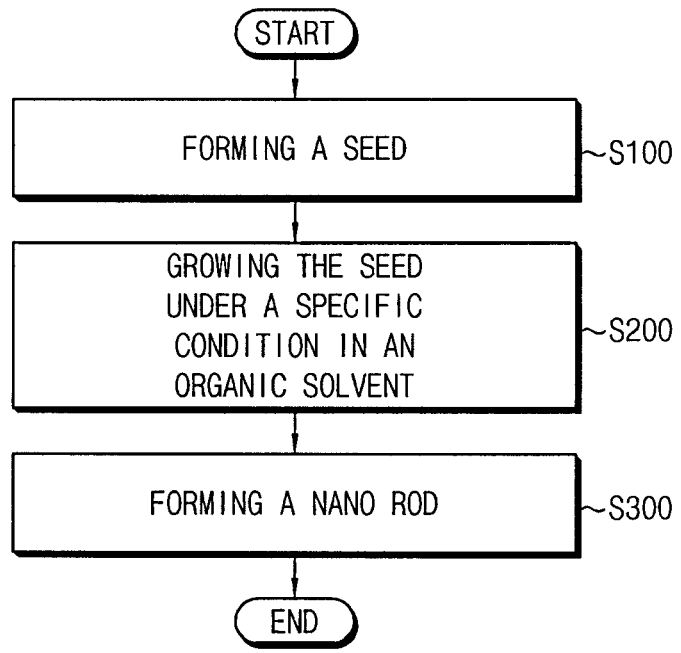
FIG. 1 is a flow-chart illustrating a method of manufacturing a nano-rod according to a first exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 2A:
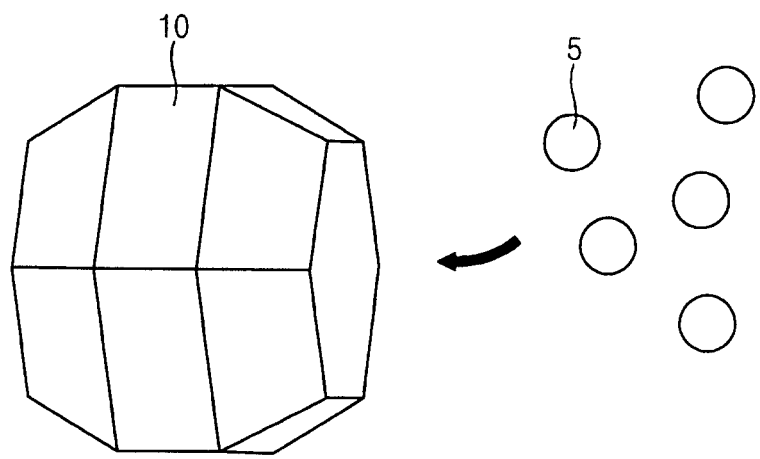
FIG. 2A and FIG. 2B are conceptual views illustrating the method of manufacturing the nano-rod in FIG. 1.
Figure 2B:
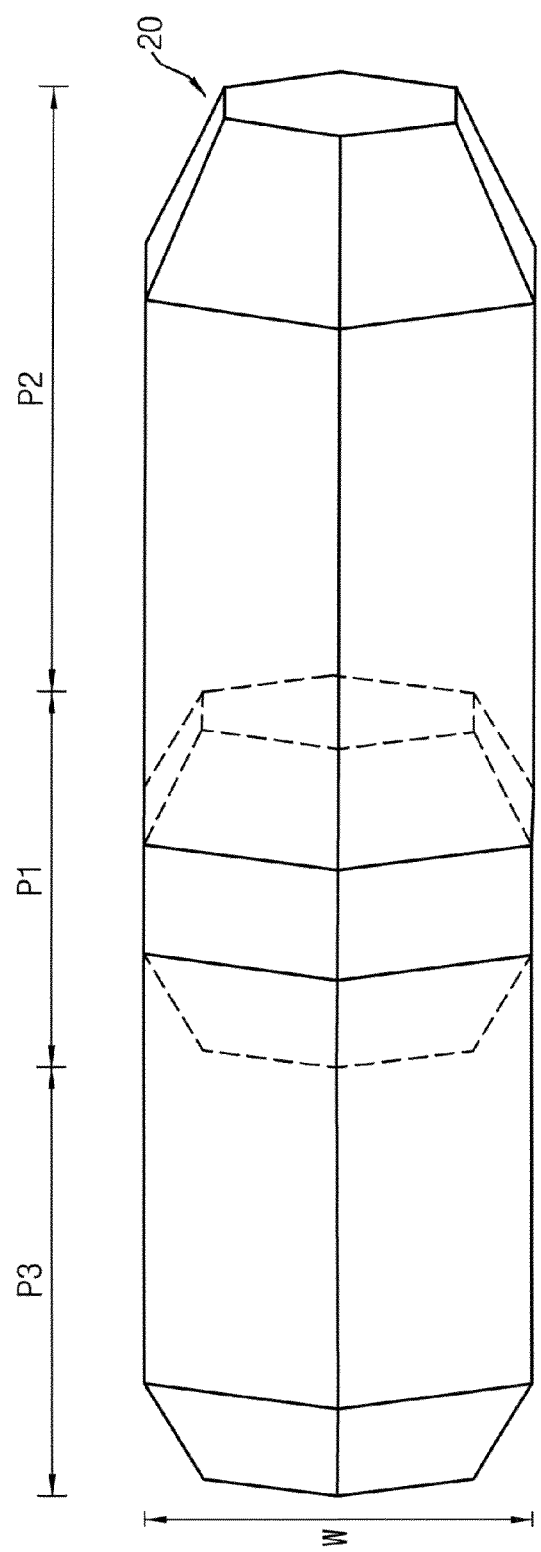

FIG. 1 is a flow-chart illustrating a method of manufacturing a nano-rod according to a first exemplary embodiment of the present invention, and FIGS. 2A and 2B are conceptual views illustrating the method of manufacturing the nano-rod in FIG. 1.

Referring to FIG. 1 and FIG. 2B, a seed 10 including a metal oxide is formed in order to form a nano-rod (Step S100).

The metal oxide may include an oxide of a transition metal. Examples of the transition metal may include gold (Au), silver (Ag), platinum (Pt), palladium (Pd), cobalt (Co), copper (Cu), molybdenum (Mo), zinc (Zn), cadmium (Cd), mercury (Hg), gallium (Ga), indium (In), tin (Zn), lead (Pb), etc. The metal oxide may be a single oxide compound or a multiple oxide compound including at least two transition metals.

The seed 10 may be formed by chemically reacting a seed metal precursor including the transition metal, for example, a transition metal complex with mixtures. The seed metal precursor used for forming the seed 10 includes substantially the same metal which is included in the nano-rod.

For example, when the seed 10 includes zinc oxide (ZnO), a first mixture including a zinc precursor and a second mixture including a hydroxide are mixed to form the seed 10. Each of the first mixture and the second mixture may further include an alcohol.

Examples of the zinc precursor may include zinc acetate, zinc acetate dehydrate, diethyl zinc, etc. Examples of the hydroxide may include lithium hydroxide, sodium hydroxide, potassium hydroxide, etc., as an alkali metal hydroxide. For example, the hydroxide may use potassium hydroxide. Here, a mole ratio between the zinc precursor and the hydroxide for forming the seed 10 may be between about 1:9 and about 1:19. The seed 10 including zinc oxide may be easily and stably formed in the above mole ratio.

Examples of the alcohol may include methyl alcohol ($CH_3OH$), ethyl alcohol ($CH_3CH_2OH$), etc. The alcohol used for forming the seed 10 may include methyl alcohol. The alcohol included in the first mixture and the alcohol included in the second mixture may be the same as or different from each other.

At a temperature between about 50° C. and about 70° C., the second mixture may be added to the first mixture. A reaction between the first and second mixtures may be performed for between about 1 hour and about 2 hours. Thus, the seed 10 may be synthesized. Several types of products including the seed 10 are formed by the reaction between the first and second mixtures, and the products are separated by a centrifuge to obtain the seed 10.

A size of the seed 10 may be determined by an amount of the seed metal precursor and/or an amount of the mixtures added in the reaction. For example, the size of the seed 10 may be controlled by an amount of the zinc precursor and/or an amount of the hydroxide.

Referring to FIG. 2A and FIG. 2B with FIG. 1, the seed 10 grows under a condition of an organic solvent (Step S200). Thus, a nano-rod 20 is formed from the seed 10 (Step S300).

The condition of the organic solvent for forming the nano-rod 20 may be defined by a solution including a metal precursor, which includes substantially the same metal as the seed 10, and the organic solvent. That is, the seed 10 grows in the solution mixing the organic solvent and the metal precursor to form the nano-rod 20. The metal precursor may be substantially the same as the seed metal precursor. A shape of the nano-rod 20 may be defined as a line shape having a length extending in substantially the same direction as a growth direction of the seed 10 or a rod shape.

For example, when a mixture including the seed 10, the metal precursor and the organic solvent are thermally decomposed, a metal atom 5 generated from the metal precursor is reacted with the seed 10 to grow the seed 10. Thus, the nano-rod 20 is formed.

In a first exemplary embodiment, a first portion P1 of the nano-rod 20 may substantially correspond to the seed 10. In addition, a second portion P2 connected to the first portion P1 may be a portion grown from the seed 10 by reacting with the metal atom 5. The nano-rod 20 may be formed by growing the seed 10 in both directions. For example, with respect to the seed 10, the nano-rod 20 may be formed by growing the seed 10 in directions different from each other. Although the second portion P2 extends toward an edge portion of the first portion P1 in FIG. 2B, a third portion P3 of the nano-rod may grow from the seed 10 in a direction opposite to the growth direction of the second portion P2. The organic solvent may determine the growth direction of the nano-rod 20, and thus the seed 10 grows to form the nano-rod 20 having the rod shape.

A width (thickness or diameter) of the nano-rod 20 may depend on the size of the seed 10. When the size of the seed 10 is increased, the width of the nano-rod 20 may be increased. In addition, when the amount of the metal precursor is increased, the length of the nano-rod 20 may be increased. When a mole ratio between the seed 10 and the metal precursor is greater than about 1:10, that is, when the amount of the metal precursor is too large, a nano structure having a bundle shape, in which a plurality of nano-rods are connected to each other, is formed to decrease a dispersibility of the nano-rod 20 for a dispersion solvent. Therefore, the seed 10 and the metal precursor having a mole ratio between about 1:1 and about 1:10 may be reacted in the organic solvent.

The organic solvent may control growth of the seed 10 in both directions so that the nano-rod 20 may be easily formed to have the rod shape. Thus, as distinguished from the nano structure of the bundle shape growing the nano-rods from a nano-plate, the organic solvent controls the growth direction of the seed 10 under the condition of the organic solvent so that one seed 10 grows to form one nano-rod 20. Although it is difficult for the nano structure having the bundle shape to be dispersed in the dispersion solvent, a plurality of the nano-rods 20 according to the first exemplary embodiment of the present invention is independent so that the nano-rods 20 are uniformly dispersed in the dispersion solvent to easily form a thin layer.

The organic solvent may have a higher boiling point than a temperature at which the metal precursor thermally reacts with the seed 10. The organic solvent may not affect the reaction between the metal precursor and the seed 10. The organic solvent may serve as a surfactant determining the growth direction of the seed 10. In addition, the organic solvent may serve as a stabilizer of forming the nano-rod 20.

Examples of the organic solvent may include trioctyl amine, octadecene or oleyl amine, etc. For example, when the organic solvent includes trioctyl amine, the organic solvent may determine the growth direction of the seed 10 and serve as the stabilizer for the nano-rod 20 having a hydrophobic characteristic, since the organic solvent has a hydrophobic characteristic caused by a lone pair of electrons of trioctyl amine so that the seed 10 forms the nano-rod 20 having the nano shape. When the organic solvent includes trioctyl amine or oleyl amine, a surfactant may not be added except for the organic solvent.

The solution including the seed 10, the metal precursor and the organic solvent may further include a surfactant with the organic solvent. The surfactant may include an alkyl amine-based compound. Examples of the alkyl amine-based compound may include hexadecyl amine, dodecyl amine, etc.

When a mole ratio between the metal precursor and the surfactant is about 1:2 to about 1:6, the nano-rod 10 may be stably formed. When the mole ratio between the metal precursor and the surfactant is greater than about 1:6, a nano particle having a hexagonal pyramid shape is more likely to be formed than the nano-rod 20 having the rod shape.

The nano-rod 20 may be synthesized under an inactive condition. For example, the inactive condition may be a gas condition of argon (Ar).

When a temperature permitting a reaction forming the nano-rod 20 is greater than about 200° C., thermal decomposition of the seed 10 and the metal precursor may be promoted to increase a growth speed of the nano-rod 20. When a temperature permitting a reaction forming the nano-rod 20 is less than about 340° C., the nano-rod 20 may be stably formed without decomposing the organic solvent. Thus, forming the nano-rod 20 from the seed 10 may ocurr at a temperature between about 200° C. and about 340° C. The temperature may instead be about 260° C. to about 300° C. At a temperature between about 200° C. and about 340° C., when the temperature is increased, the width of the nano-rod 20 may be increased independently of the size of the seed 10, and the length of the nano-rod 20 may be decreased. Therefore, the temperature forming the nano-rod 20 may be determined by a requirement of users in a range of about 200° C. to about 340° C.

The size and the shape of the nano-rod 20 may be controlled by the amount of the metal precursor, the amount of the surfactant, a reaction time, or the temperature. For example, the width (thickness or diameter) of the nano-rod 20 may be about 0.5 nm to about 50 nm. Here, the length of the nano-rod 20 may be about 1 nm to about 1 μm.

The nano-rod 20 may include gold oxide, silver oxide, platinum oxide, palladium oxide, cobalt oxide, copper oxide, molybdenum oxide, zinc oxide, cadmium oxide, mercury oxide, gallium oxide, indium oxide, tin oxide, lead oxide, etc., according to a metal type included in the seed 10.

Example 1

A first mixture including about 3.35 mmol of zinc acetate dihydrate and about 0.77 mmol of methyl alcohol (about 31.25 mL, Molecular weight of 32 and specific gravity of about 0.791) and a second mixture including about 32.95 mmol of potassium hydroxide and about 0.40 mmol (about 16.25 mL) of methyl alcohol were mixed. The first and second mixtures were reacted at a temperature between about 50° C. and about 70° C. for about 1 hour to about 2 hours to form a seed.

About 0.25 mmol of the seeds, about 0.5 mmol of zinc acetate, about 2 mmol of oleyl amine and about 14 mmol (about 5 g) of trioctyl amine (Molecular weight of 353.67) were reacted at a temperature of about 270° C. under a condition of argon gas, for about 1.5 hours. Thus, a nano-rod according to Example 1 of the present invention was manufactured.

Figure 3:
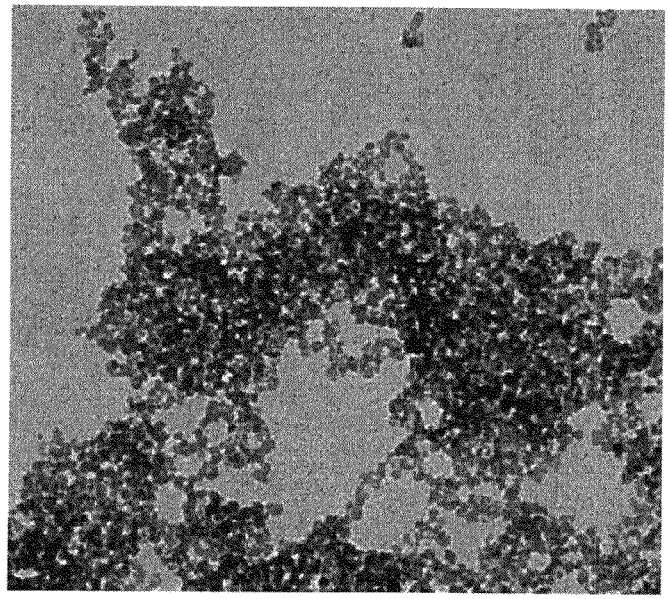
FIG. 3 and FIG. 4 are TEM (transmission electron microscope) pictures of a seed and a nano-rod manufactured according to Example 1 of the present invention.
Figure 4:
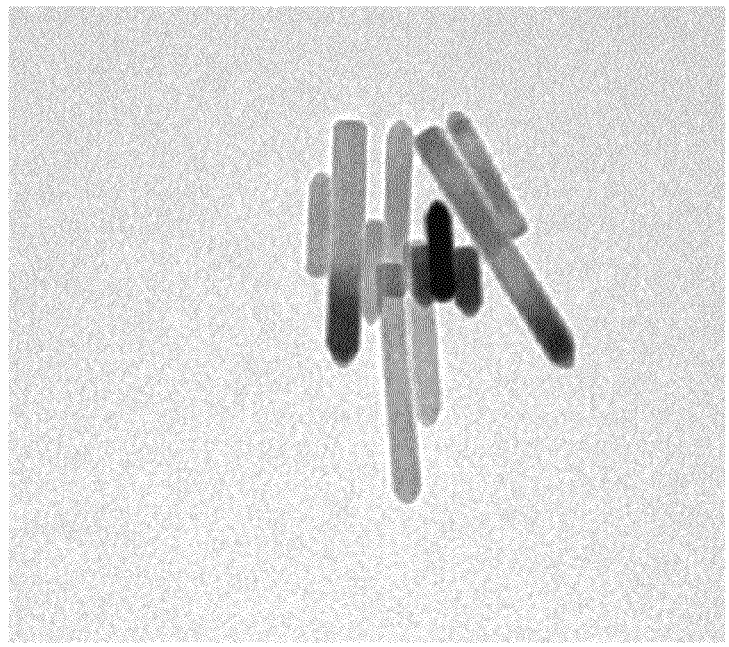

FIGS. 3 and 4 are TEM (transmission electron microscope) pictures of a seed and a nano-rod manufactured according to Example 1 of the first exemplary embodiment of the present invention.

Referring to FIG. 3, the seeds having a diameter of about 5 nm are formed using zinc acetate dehydrate and potassium hydroxide. Referring to FIG. 4, the seeds grow under a condition of trioctyl amine as an organic solvent to form the nano-rods having a rod shape.

Example 2

A first mixture including about 3.35 mmol of zinc acetate dihydrate and about 0.77 mmol of methyl alcohol (about 31.25 mL) and a second mixture including about 60.59 mmol of potassium hydroxide and about 0.40 mmol (about 16.25 mL) of methyl alcohol were mixed. The first and second mixtures were reacted at a temperature between about 50° C. and about 70° C. for about 1 hour to about 2 hours to form a seed.

About 0.1 mmol of the seeds, about 1.0 mmol of zinc acetate, about 4.0 mmol of oleyl amine and about 14 mmol (about 5 g) of trioctyl amine (Molecular weight of 353.67) were reacted at a temperature of about 270° C. in an atmosphere of argon gas, for about 1.5 hours. Thus, a nano-rod according to Example 2 of the present invention was manufactured.

Figure 5:
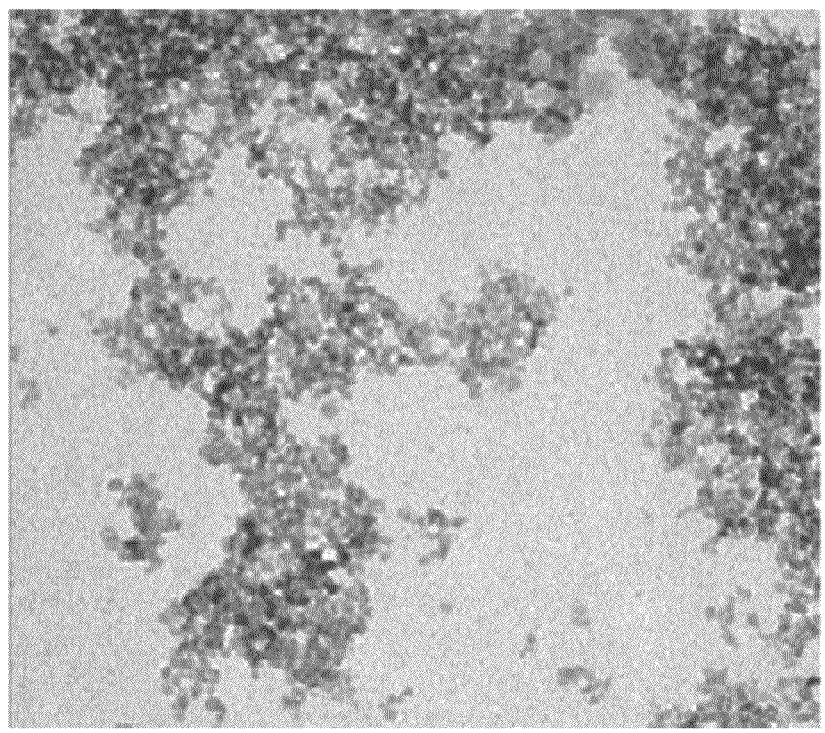
FIG. 5 and FIG. 6 are TEM pictures of a seed and a nano-rod manufactured according to Example 2 of the present invention.
Figure 6:
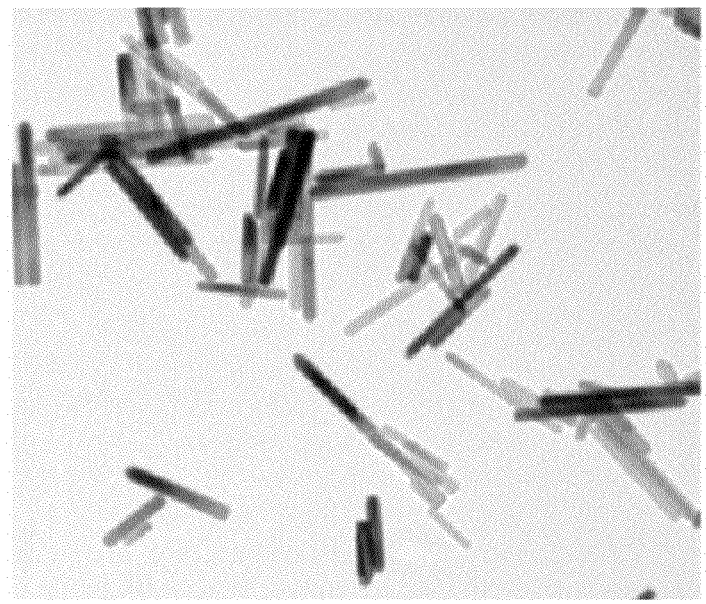

FIGS. 5 and 6 are TEM pictures of a seed and a nano-rod manufactured according to Example 2 of the first exemplary embodiment of the present invention.

Referring to FIG. 5, the seeds having a diameter of about 5 nm are formed using zinc acetate dehydrate and potassium hydroxide. Referring to FIG. 6, the seeds grow under a condition of trioctyl amine as an organic solvent to form the nano-rods having a rod shape.

According to the present invention, the seeds including metal oxide react with a metal precursor in an organic solvent so that a nano-rod having a rod shape may be independently formed from each of the seeds.

In addition, as distinguished from a hydrothermal reaction, the seeds grow in the organic solvent so that the thickness of the nano-rods may be controlled by a crystal property of the seed and a size of the seed. The thickness, length, etc., of the nano-rod may be easily controlled according to an amount of the metal precursor and an amount of the surfactant added in the organic solvent, and a reaction time. The nano-rods are synthesized to have a high crystal property.

Hereinafter, a method of manufacturing a display substrate using the method of manufacturing the nano-rods as discussed above will be illustrated referring to FIG. 7. In addition, FIGS. 8 to 13 illustrate display substrates of various structures manufactured according to a exemplary embodiments of the present invention.

Figure 7:
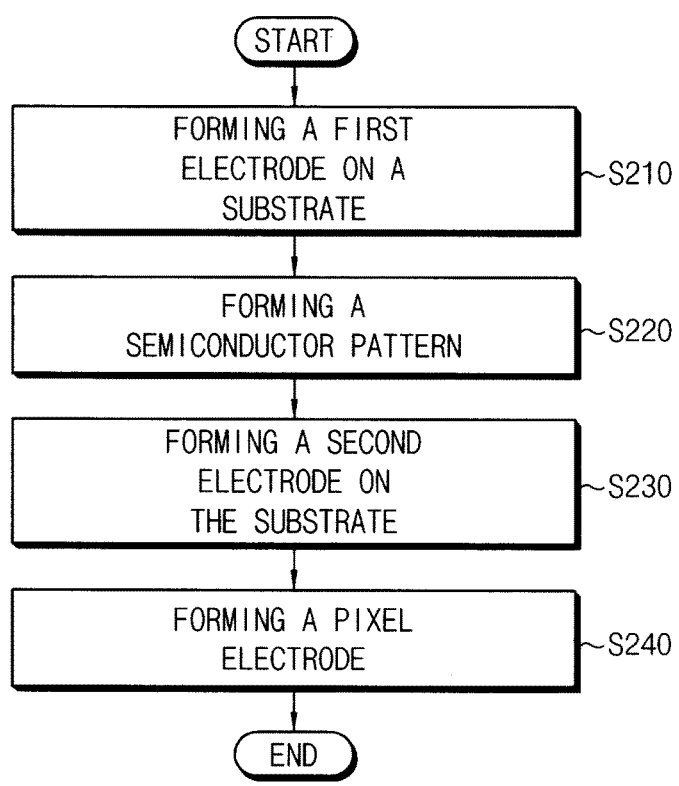
FIG. 7 is a flow-chart illustrating a method of manufacturing a display substrate according to a second exemplary embodiment of the present invention.

FIG. 7 is a flow-chart illustrating a method of manufacturing a display substrate according to a second exemplary embodiment of the present invention.

Referring to FIG. 7, a first electrode is formed on a substrate (Step S210). The first electrode may serve as an electrode connected to a first signal line, and the first electrode may be a control electrode of a thin-film transistor. Alternatively, the first electrode may include an input electrode connected to the first signal line and an output electrode spaced apart from the input electrode of the thin-film transistor. A first metal layer is formed on the substrate and is patterned, and thus the first electrode is formed.

A semiconductor pattern is formed on the substrate on which the first electrode is formed (Step S220).

A semiconductor layer is formed on the substrate on which the first electrode is formed and is patterned, and thus the semiconductor pattern is formed. The semiconductor pattern is formed on an insulating layer covering the first electrode. After forming a seed including zinc oxide, the semiconductor layer may be formed by coating a solution including a nano-rod formed by reacting with a metal precursor and the seed in an organic solvent on the substrate on which the first electrode is formed. The solution including the nano-rod may be defined as a state diffusing the nano-rod in a diffusing solvent. The solution including the nano-rod is slit-coated and/or spin-coated on the substrate to form the semiconductor layer. Forming the nano-rod is substantially the same as the method of manufacturing the nano-rod, as illustrated above, and thus any repetitive descriptions will be omitted.

The semiconductor layer is patterned by a photolithography process to form the semiconductor pattern. The semiconductor pattern partially overlaps with the first electrode. For example, an edge portion of the semiconductor pattern may overlap with the first electrode. The semiconductor pattern is formed using the semiconductor layer including the nano-rod, and thus a grain boundary between the nano-rods may be minimized when the current is applied to the semiconductor pattern. That is, the nano-rod has a rod shape so that the grain boundary may be decreased more than for a nano particle having a spherical shape. Therefore, the electron mobility of the semiconductor pattern may be improved and thus, the electrical characteristic of a transistor including the semiconductor pattern may be improved.

A second electrode is formed on the substrate on which the semiconductor pattern is formed (Step S230).

The second electrode may include an input electrode connected to a second signal line crossing the first signal line and an output electrode spaced apart from the input electrode when the first electrode is the control electrode. Although not shown in FIG. 7, when the first electrode is the control electrode and the second electrode includes the input and output electrodes, the first electrode and the semiconductor pattern are insulated from each other by a first insulating layer. That is, the semiconductor pattern is formed on the first insulating layer covering the first electrode. The second electrode makes contact with the semiconductor pattern. Here, an ohmic contact layer decreasing a contact resistance between the second electrode and the semiconductor pattern may be further formed between the second electrode and the semiconductor pattern.

Alternatively, when the first electrode includes the input electrode and the output electrode, the second electrode may be a control electrode connected to a second signal line crossing the first signal line. The second electrode may be formed by patterning a second metal layer formed on the substrate on which the semiconductor pattern is formed. Although not shown in FIG. 7, when the first electrode includes the input and output electrodes and the second electrode is the control electrode, the semiconductor pattern and the second electrode are insulated from each other by a second insulating layer. That is, the second electrode is formed on the second insulating layer covering the semiconductor pattern, and the first electrode directly makes contact with the semiconductor pattern. Here, an ohmic contact layer decreasing a contact resistance between the first electrode and the semiconductor pattern may be further formed between the first electrode and the semiconductor.

Then, a pixel electrode is formed on the substrate on which the second electrode is formed (Step S240). The pixel electrode is electrically connected to the thin-film transistor. The pixel electrode makes direct contact with the output electrode.

When the second electrode includes the input and output electrodes, the pixel electrode may make partial contact with the second electrode. Here, a third insulating layer is formed on the input and output electrodes, and the third insulating layer may include a contact hole partially exposing the output electrode. The pixel electrode is formed on the third insulating layer and makes contact with the output electrode through the contact hole.

When the first electrode includes the input and output electrodes, the pixel electrode may make partial contact with the first electrode. Here, a fourth insulating layer covering the second electrode is formed on the second electrode, and the first and fourth insulating layers may include a contact hole partially exposing the output electrode. The pixel electrode is formed on the fourth insulating layer and makes contact with the output electrode through the contact hole.

According to the above descriptions, the semiconductor pattern of the thin-film transistor is formed using the nano-rod formed in the organic solvent to improve the productivity and the electrical characteristic of the thin-film transistor.

Hereinafter, structures of display substrates capable of being manufactured by the method of manufacturing the display substrate illustrated in FIG. 7 and a method of manufacturing each of the display substrates will be illustrated.

Figure 8:
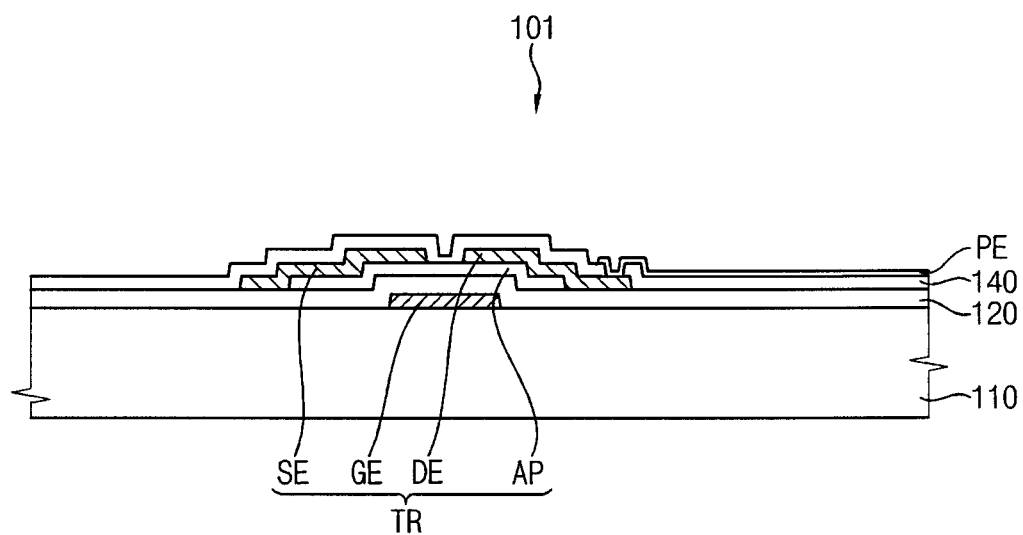
FIG. 8, FIG. 9, and FIG. 10 are cross-sectional views illustrating display substrates having various structures manufactured according to the second exemplary embodiment of the present invention.
Figure 9:
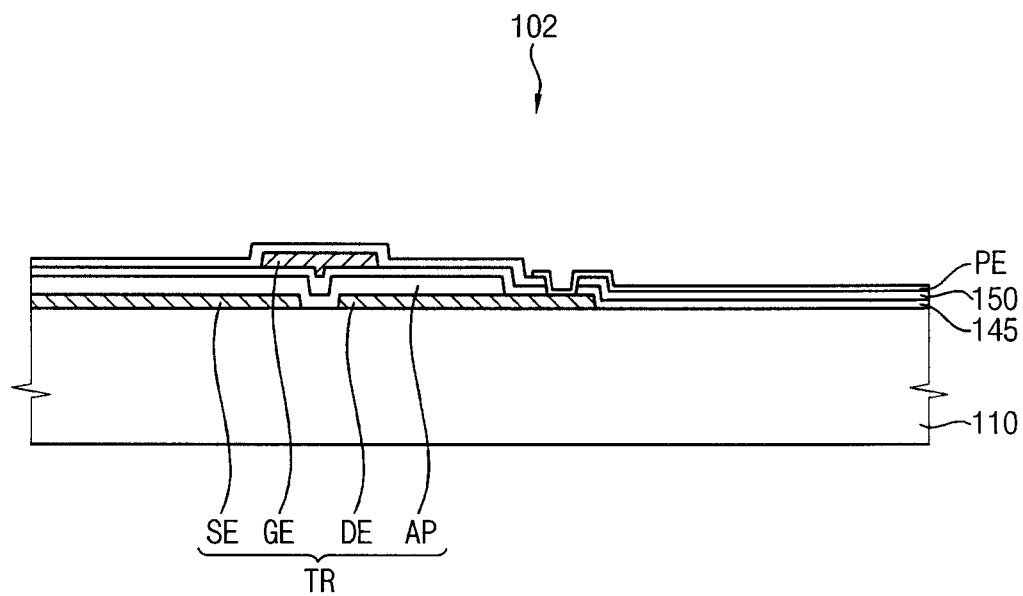
Figure 10:
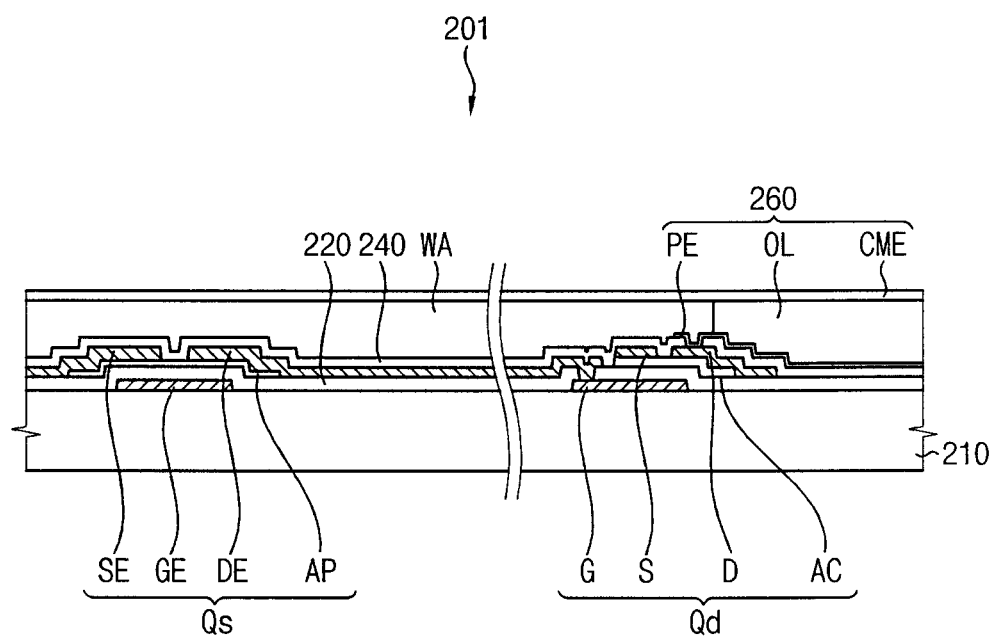

FIGS. 8, 9 and 10 are cross-sectional views illustrating display substrates having various structures manufactured according to the second exemplary embodiment of the present invention.

Referring to FIG. 8, a display substrate 101 includes a switching element TR and a pixel electrode PE. The switching element TR includes a control electrode GE formed on a substrate 110, a semiconductor pattern AP formed on the control electrode GE, and an input electrode SE and an output electrode DE formed on the semiconductor pattern AP. The control electrode GE is connected to a gate line, and the input electrode SE is connected to a data line. The semiconductor pattern AP is formed on a first insulating layer 120 covering the control electrode GE and includes a nano-rod including indium oxide. The input and output electrodes SE and DE are covered by a second insulating layer 140. The second insulating layer 140 partially exposes the output electrode DE, and the exposed output electrode DE makes contact with the pixel electrode PE. The switching element TR may be a thin-film transistor driving a pixel or being formed in a circuit portion connected to the pixel.

In order to manufacture the display substrate 101 in FIG. 8, a first metal layer is formed on the substrate 110, and the first metal layer is patterned to form the gate line and the control electrode GE. After the first insulating layer 120 is formed and a semiconductor layer including the nano-rod including zinc oxide is formed on the first insulating layer 120, the semiconductor layer is patterned to form the semiconductor pattern AP. A method of manufacturing the nano-rod included in the semiconductor layer is substantially the same as illustrated above in FIGS. 1, 2A and 2B. In addition, a method of forming the semiconductor layer is substantially the same as illustrated above in FIG. 7. Thus, any repetitive descriptions will be omitted.

A second metal layer is formed on the substrate 110 on which the semiconductor pattern AP is formed, and the second metal layer is patterned to form the data line, the input electrode SE and the output electrode DE. Then, the second insulating layer 140 is formed, and the pixel electrode PE is formed after the second insulating layer 140 is partially removed to partially expose the output electrode DE. Thus, the display substrate 101 shown in FIG. 8 is manufactured.

Referring to FIG. 9, as distinguished from what is illustrated in FIG. 8, in a display substrate 102 shown in FIG. 9, an input electrode SE and an output electrode DE of a switching element TR are formed on a substrate 110, and a semiconductor pattern AP is formed on the substrate 110 on which the input and output electrodes SE and DE are formed. A control electrode GE is formed on the semiconductor pattern AP, and the control electrode GE and the semiconductor pattern AP are insulated from each other by a third insulating layer 145. The control electrode GE is covered by a fourth insulating layer 150, and a pixel electrode PE is formed on the fourth insulating layer 150. The output electrode DE makes contact with the pixel electrode through a hole passing through the third and fourth insulating layers 145 and 150.

In order to manufacture the display substrate 102 shown in FIG. 9, a first metal layer is formed on the substrate 110 and is patterned, thereby forming the input electrode SE connected to a data line and the output electrode DE. A semiconductor layer including the nano-rod including zinc oxide is formed on the substrate 110 on which the input electrode SE and the output electrode DE are formed. The semiconductor layer is patterned to form the semiconductor pattern AP. Then, the third insulating layer 145, the control electrode GE and the fourth insulating layer 150 are sequentially formed, and the third and fourth insulating layers 145 and 150 are patterned to form the hole. The pixel electrode PE is formed on the fourth insulating layer 150 in which the hole is formed to manufacture the display substrate 102 shown in FIG. 9.

Referring to FIG. 10, a display substrate 201 shown in FIG. 10 includes a gate line (not shown), a data line (not shown), a power supply line (not shown), a switching element Qs, a driving element Qd, a wall WA and an electro luminous element 260. Each of the switching element Qs and the driving element Qd is a thin-film transistor. The switching element Qs is connected to the gate line and the data line, and includes a switching control electrode GE, a switching input electrode SE, a switching output electrode DE and a semiconductor pattern AP. The driving element Qd is connected to the switching element Qs and the power supply line, and includes a driving control electrode G, a driving input electrode S, a driving output electrode D and an active pattern AC. The driving control electrode G is electrically connected to the switching output electrode DE.

Each of the semiconductor pattern AP and the active pattern AC includes a nano-rod including zinc oxide, and the semiconductor pattern AP is formed on a first insulating layer 220 on the switching control electrode GE. In addition, the active pattern AC is formed on the first insulating layer 220 on the driving control electrode G. The active pattern AC may be formed in forming the semiconductor pattern AP. The driving element Qd provides more electrons to the electro luminous element 260 than the switching element Qs because it functions as an organic light emitting diode ("OLED"). The active pattern AC is formed using the nano-rod to improve the electron mobility. Thus, sufficient electrons may be provided to the electro luminous element 260 in a short time period.

The electro luminous element 260 includes a pixel electrode PE electrically connected to the driving element Qd, an emission layer OL and a cathode CME. The pixel electrode PE serves an anode of the electro luminous element 260 and provides a hole to the emission layer OL, and the cathode CME provides the electron to the emission layer OL. The hole and the electron are combined in the emission layer OL to form an exiton. The pixel electrode PE may be a reflective electrode, and the cathode CME may be a transmission electrode. Alternatively, the pixel electrode may be the transmission electrode and the cathode CME may be the reflective electrode.

A second insulating layer 240 is formed on a base substrate 210 including the switching input and output electrodes SE and DE and the driving input and output electrodes S and D. The wall WA is formed on the switching element Qs and the driving element Qd, and partially exposes the pixel electrode PE. The emission layer OL is formed on the pixel electrode PE exposed through the wall WA, and the cathode CME makes contact with the wall WA and the emission layer OL.

In order to manufacture the display substrate 201, a first metal layer is formed on a substrate 210, and the first metal layer is patterned to form the switching control electrode GE and the driving control electrode G. After forming the first insulating layer 220, a semiconductor layer including the nano-rod is formed and patterned to form the semiconductor pattern AP and the active pattern AC. A method of manufacturing the nano-rod is substantially the same as illustrated above in FIGS. 1, 2A and 2B. In addition, a method of forming the semiconductor layer is substantially the same as illustrated above in FIG. 7. Thus, any repetitive descriptions will be omitted. A second metal layer is patterned to form the switching input and output electrodes SE and DE and the driving input and output electrodes S and D, and the second insulating layer 240 is formed. After the pixel electrode PE is formed on the second insulating layer 240, the wall WA, the emission layer OL and the cathode CME are sequentially formed. Thus, the display substrate 201 shown in FIG. 10 is manufactured.

Hereinafter, referring to FIG. 11 and FIG. 12, display substrates formed by method different from a method illustrated in FIG. 7 will be illustrated.

Figure 11:
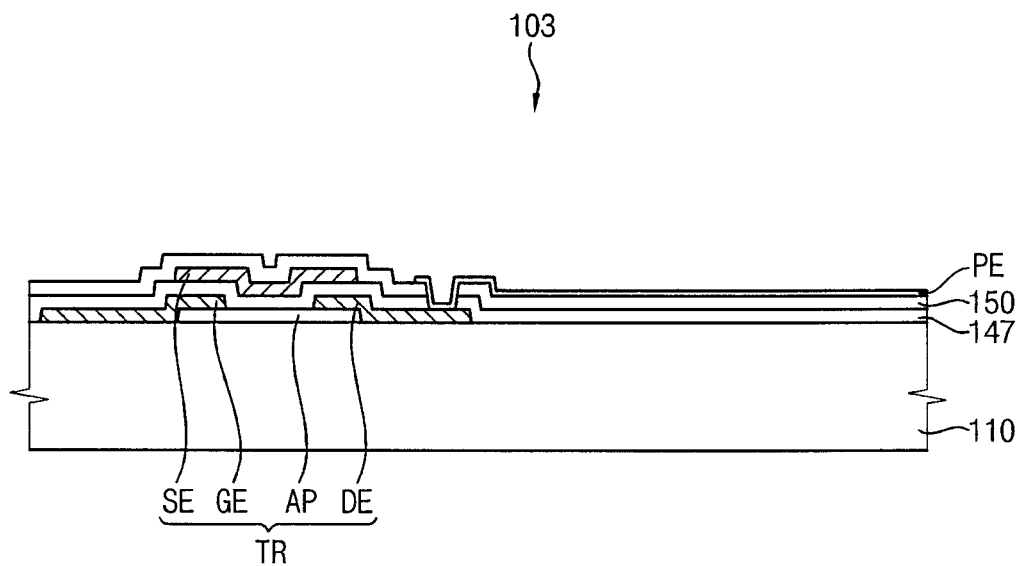
FIG. 11 and FIG. 12 are cross-sectional views illustrating a method of manufacturing a display substrate according to a third exemplary embodiment of the present invention.
Figure 12:
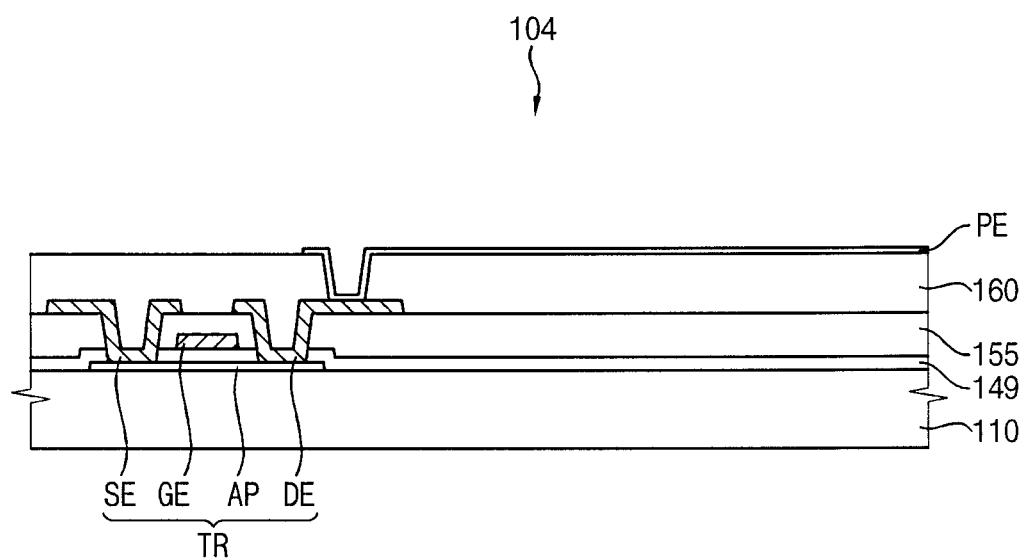

FIGS. 11 and 12 are cross-sectional views illustrating a method of manufacturing a display substrate according to a third exemplary embodiment of the present invention.

Referring to FIG. 11, a display substrate 103 includes a switching element TR including a semiconductor pattern AP formed on a substrate 110, an input electrode SE, an output electrode DE, and a control electrode GE. The input and output electrodes SE and DE are formed on the substrate 110 on which the semiconductor pattern AP is formed. The switching element TR is connected to a pixel electrode PE. The input and output electrodes SE and DE are insulated from the control electrode GE by a third insulating layer 147, and the control electrode GE is insulated from the pixel electrode PE by a fourth insulating layer 150.

In order to manufacture the display substrate 103 shown in FIG. 11, a semiconductor layer including the nano-rod including zinc oxide is formed on the substrate 110, and the semiconductor layer is patterned to form the semiconductor pattern AP. A method of manufacturing the nano-rod is substantially the same as illustrated above in FIGS. 1, 2A and 2B, and thus any repetitive descriptions will be omitted. The input and output electrodes SE and DE are formed on the substrate 110 on which the semiconductor pattern AP is formed, and the third insulating layer 147 is formed on the input and output electrodes SE and DE. Then, the control electrode GE and the fourth insulating layer 150 are sequentially formed, and the pixel electrode PE is formed after forming a hole passing through the third and fourth insulating layers 147 and 150.

Referring to FIG. 12, a display substrate 104 includes a switching element TR including a semiconductor pattern AP, a control electrode GE formed on the semiconductor pattern AP, an input electrode SE and an output electrode DE, and a pixel electrode PE. The semiconductor pattern AP is directly formed on the substrate 110, and the semiconductor pattern AP and the control electrode GE are insulated from each other by a fifth insulating layer 147. The input and output electrodes SE and DE are insulated from the control electrode GE by a sixth insulating layer 155, and the semiconductor pattern AP makes direct contact with the input electrode SE and the output electrode DE through holes passing through the fifth and sixth insulating layers 149 and 155. A seventh insulating layer 160 covers the input and output electrodes SE and DE, and the output electrode DE partially exposed by the seventh insulating layer 160 makes contact with the pixel electrode.

In order to manufacture the display substrate 104 shown in FIG. 12, a semiconductor layer including the nano-rod including zinc oxide is formed on the substrate 110, and the semiconductor layer is patterned to form the semiconductor pattern AP. A method of manufacturing the nano-rod is substantially the same as illustrated above in FIGS. 1, 2A and 2B, and thus any repetitive descriptions will be omitted.

After forming the semiconductor pattern AP, the fifth insulating layer 149 and the control electrode GE are sequentially formed. After the sixth insulating layer 155 is formed on the control electrode GE and the holes passing through the fifth and sixth insulating layers 149 and 155 are formed, the input and output electrodes SE and DE are formed. Then, after the seventh insulating layer 160 is formed and patterned to partially expose the output electrode DE, the pixel electrode PE is formed. Thus, the display substrate 104 shown in FIG. 12 is manufactured.

In FIGS. 7 to 12, after pattering the semiconductor layer including the nano-rod to form the semiconductor pattern AP, the input electrode SE and the output electrode DE are formed using a mask different from a mask used in forming the semiconductor pattern to manufacture the display substrates 101, 102, 201, 103 and 104. Alternatively, after the semiconductor layer is formed on a substrate on which a control electrode is formed and a metal layer is formed on the semiconductor layer, the semiconductor layer and the metal layer may be patterned using a single mask to form a semiconductor pattern, an input electrode and an output electrode. Here, the single mask used for patterning the semiconductor layer and the metal layer may include a half-tone portion or a diffraction portion.

According to the present invention, the seeds are reacted in the organic solvent with the metal precursor so that the nano-rod may be independently formed from the seeds. As distinguished from a hydrothermal reaction, the seeds grow in the organic solvent so that the width (thickness or diameter) of the nano-rod may be controlled by a crystal property of the seed and a size of the seed. In addition, the nano-rod may be easily formed at a lower temperature than the hydrothermal reaction.

The thickness, length, etc. of the nano-rod may be easily controlled according to an amount of the metal precursor and an amount of the surfactant added in the organic solvent, and a reaction time. Therefore, the productivity and the manufacturing reliability of the nano-rod may be improved. In addition, a semiconductor layer including the nano-rod may be easily formed in a large-sized substrate to improve the productivity and the manufacturing reliability of a display substrate.

It will be apparent to those skilled in the art that various modifications and variations can be made in the present invention without departing from the spirit or scope of the invention. Thus, it is intended that the present invention cover the modifications and variations provided they come within the scope of the appended claims and their equivalents.

What is claimed is:

1. A method of forming nano-rods, the method comprising:
   forming seed particles comprising a metal oxide, in a first solution;
   removing the seed particles from the first solution; and
   forming nano-rods in a second solution comprising the seed particles dispersed therein, a metal precursor of a metal of the metal oxide, and an organic solvent, such that each of the seed particles grows in two opposing directions, to form the nano-rods extending in a direction substantially parallel to the two opposing directions and being larger than the seed particles,
   wherein the nano rods are formed at a temperature between about 200° C. and about 340° C., and
   wherein the nano rods are formed by reacting about 0.05 mmol to about 0.35 mmol of the seed particles, about 0.1 mmol to about 1.5 mmol of the metal precursor, and about 0.5 mmol to about 3.5 mmol of a surfactant with about 1 g to about 10 g of the organic solvent.

2. The method of claim 1, wherein the organic solvent comprises at least one selected from a group consisting of trioctyl amine, octadecene and oleyl amine.

3. The method of claim 1, wherein the metal precursor comprises at least one selected from a group consisting of zinc acetate and zinc acetate dehydrate.

4. The method of claim 1, wherein, in forming the nano-rods, an alkyl amine-based surfactant different from the organic solvent is further added in the organic solvent.

5. A method of forming nano-rods, the method comprising:
   forming seed particles comprising a metal oxide, in a first solution, the first solution comprising a metal precursor of a metal of the metal oxide, a hydroxide, and an alcohol;
   removing the seed particles from the first solution; and
   forming nano-rods in a second solution comprising the seed particles dispersed therein, a metal precursor of the metal of the metal oxide, and an organic solvent, such that each of the seed particles grows in two opposing directions to form the nano-rods extending in a direction substantially parallel to the two opposing directions and being larger than the seed particles,
   wherein the nano rods are formed at a temperature between about 200° C. and about 340° C.
   wherein the nano rods are formed by reacting about 0.05 mmol to about 0.35 mmol of the seed particles, about 0.1 mmol to about 1.5 mmol of the metal precursor, and about 0.5 mmol to about 3.5 mmol of a surfactant with about 1 g to about 10 g of the organic solvent, and
   wherein the organic solvent comprises at least one selected from a group consisting of trioctyl amine, octadecene, and oleyl amine.

6. The method of claim 1, wherein, in forming the nano rods, a mole ratio between the seed particles and the metal precursor is between about 1:1 and about 1:10.

7. The method of claim 6, wherein, in forming the nano rods, a surfactant different from the organic solvent is further added in the organic solvent, and
   wherein a mole ratio between the metal precursor and the surfactant is between about 1:2 and about 1:6.

8. The method of claim 1, wherein the organic solvent controls the growth direction of the nano-rods.

9. The method of claim 5, wherein the organic solvent controls the growth direction of the nano-rods.

* * * * *